(No Model.)

C. F. JENKINS.
KINETOGRAPHIC CAMERA.

No. 560,800. Patented May 26, 1896.

Witnesses
J. B. Hull.
B. L. Reed.

Inventor
C. Francis Jenkins

ANDREW B.GRAHAM PHOTO-LITHO WASHINGTON.D.C

UNITED STATES PATENT OFFICE.

CHARLES FRANCIS JENKINS, OF RICHMOND, INDIANA.

KINETOGRAPHIC CAMERA.

SPECIFICATION forming part of Letters Patent No. 560,800, dated May 26, 1896.

Application filed December 12, 1894. Serial No. 531,556. (No model.)

*To all whom it may concern:*

Be it known that I, CHARLES FRANCIS JENKINS, of Richmond, Wayne county, State of Indiana, have invented a new and useful Kinetographic Camera, or instrument for recording any active scene and afterward reproducing the same upon a screen or otherwise, of which the following is a specification.

My invention, a combination of a photo-camera or receiver and a stereopticon or deliverer, consists, generally speaking, of a moving sensitive continuous film upon which pictures are photographed by the action of light through a number of lenses revolving around a common axis, and in the reproduction of these pictures by passing an electric or other suitable light through them and through properly-operated lenses upon a ground-glass plate, screen, or other prepared surface.

In the accompanying drawings, forming a part of this specification, like symbols refer to like parts wherever they occur, in which—

Figure 2:
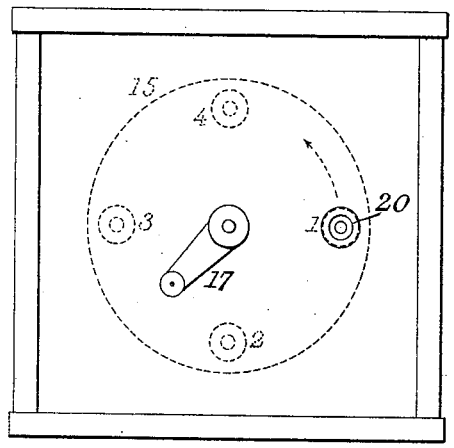
Figure 1:
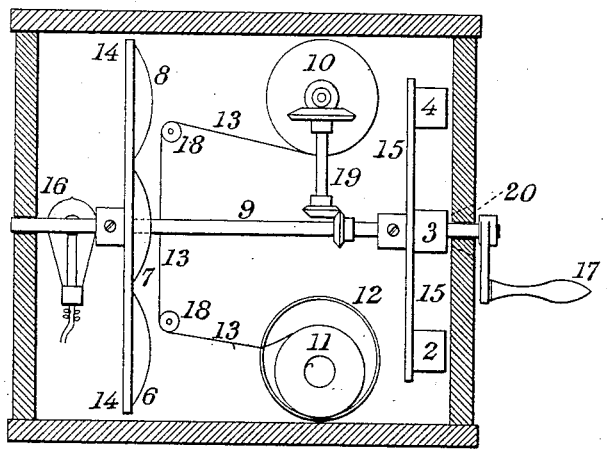

Figure 1 is a sectional elevation of the phantoscope, showing the relative positions of the different parts and in which, to avoid confusion, the frame construction is omitted. Fig. 2 is an end view showing by dotted lines the shutter and lenses mounted thereon.

In the drawings, the numerals 1, 2, 3, and 4 represent the lenses mounted on the circular shutter 15, which is rigidly secured to the shaft 9.

12 is a light-tight box, through a slit in the length of which the negative film 13 (say three inches in width and of indefinite length) from the roll 11 thereof is drawn around the small rollers 18 and 18 and wound upon the drum 10, the result of motion communicated from the main shaft 9 through the shaft 19. An opening in the end of the machine, through which the light is admitted by the passing of the lenses, is shown at 20 in Fig. 2 and by dotted lines 20 in Fig. 1.

14 is a circular plate carrying four condensing-lenses, of which three, designated 6, 7, and 8, are shown, for condensing the rays of light from the lamp 16.

In Fig. 2 lens 1 is in position to make a photograph upon the sensitive film 13, Fig. 1. If shutter 15, upon which this lens and also lenses 2, 3, and 4 are mounted, be now revolved upon its axis in the direction of the dotted arrow, it will bring the lenses 2, 3, and 4 successively before the opening 20. As each lens passes the opening a photograph is made upon the film; but as the film is wound upon the drum 10 by being connected with the shaft 9 through the shaft 19 each picture is taken in a new place upon the film, the film and lens moving upward exactly together, the former in a straight line and the latter through a small arc. The result of the continuation of such action is a length of negative film with similar pictures photographed thereon, each picture, however, being slightly different from the preceding one, owing to the constant movement of the object photographed. This negative film is removed, developed, and a positive printed therefrom, all in the usual manner. The positive film is now rolled up and inserted in box 12 and the end of the film again made fast to the drum 10 after passing around the rollers 18 and 18. An electric current is now sent through the lamp 16, and the light therefrom passes through the condensing-lenses successively, which are placed, one each, opposite the projecting lenses 1, 2, 3, and 4 on the forward shutter 15. This rear carrier 14 is mounted on the shaft 9 and revolves in a plane parallel to the shutter 15. By operating the machine the light passes through the condensing-lens, the film, the objective lens and projects shadow-pictures upon the screen placed in position to receive them, and which are superposed upon each other so rapidly that the eye of the observer does not see each of the pictures separately, but gets the sense of one continuous picture and that having every action of the object previously photographed.

I do not wish to be understood as confining myself to the particular construction herein described, for I am aware that the same result may be accomplished by modifications of the parts and positions of the different parts of the whole and by the use of apparatus apparently wholly different. What I have discovered, however, is that photographs may be taken upon a constantly-moving negative-surface provided the rays of light from the object being photographed are made to travel synchronously therewith. Thus rays of light from the object impinge upon the negative and travel along with it without movement from their respective positions on the negative until shut off entirely. In reproducing the pictures the same action takes place, but in a reverse direction—that is, light passes out through the surface carrying the pictures and impinges upon the eye or upon a screen placed to receive it.

What I claim as my invention, therefore, and wish to protect by Letters Patent, is—

1. The combination, in a photocamera device, of a casing, lenses revoluble about a common axis therein, means for supporting and advancing a sensitive tape in the focus of said lenses, and mechanically adapted to produce discrete photographic impressions on said sensitive tape, substantially as described.

2. In a picture-exhibiting device, the combination of two or more lenses revoluble about a common axis, means for supporting and advancing in the focus of said lenses a surface upon which are arranged a series of pictures of an object in motion, and a lighting device mechanically adapted and so located as to illuminate and project said pictures onto a suitable receiving-surface, substantially as described.

3. A device for producing animated pictures, comprising a casing, a shaft revoluble therein, a forward and an after lens-carrier mounted upon said shaft, rollers for supporting a film, a roller, shaft and gearing for feeding the film forward, a light-tight box holding an unused film, and a lighting device, all substantially as described herein.

4. A device for producing animated pictures, comprising a casing, a shaft revoluble therein, a lens-carrier mounted upon said shaft, rollers for supporting a film, a roller, shaft and gearing for feeding the film forward, and a light-tight box for holding the unused film, substantially as set forth herein.

5. A device for producing animated pictures, comprising a casing, a shaft revoluble therein, a forward and an after lens-carrier mounted upon said shaft, rollers for supporting a film, a roller and gearing for feeding the same forward, and an electric lamp or other suitable illuminating device, substantially as set forth.

6. A device for producing animated pictures, comprising a casing, a lens-carrier mounted upon said shaft, rollers for supporting the film, a roller and gearing for feeding forward the same, substantially as described.

7. A device for producing animated pictures, comprising a casing, a forward and an after rotating lens-carrier, means for revolving them synchronously, means for supporting and feeding a film, a light-tight box holding an unused film, and a lamp, all substantially as described herein.

8. A device for producing animated pictures, comprising a casing, a lens-carrier revoluble therein, means for supporting and continuously feeding a film, and a light-tight box, substantially as set forth herein.

9. A device for producing animated pictures, comprising a casing, a forward and an after lens-carrier, means for revolving them synchronously, means for supporting and feeding a film, and an electric lamp or other suitable illuminating device, substantially as set forth.

10. A device for producing animated pictures, comprising a casing, a forward and an after lens-carrier, and means for supporting and feeding a film, substantially as described.

11. A device for producing photographic impressions, comprising a casing, means for supporting therein and continuously feeding a strip of sensitive tape synchronously with a moving lens mechanically adapted to produce discrete photographic impressions by causing light reflected from the object photographed to intermittently fall upon and move synchronously with said sensitive tape, substantially as described.

12. An apparatus for exhibiting pictures, comprising means for supporting and feeding a picture-carrying surface so as to cause the pictures thereon to be successively exposed in an illuminated field, means for illuminating and projecting the pictures exposed in said field, and means for causing the resultant picture-carrying light to maintain such movement that the axes of the successive positions of the projected light shall always remain parallel, substantially as described.

C. FRANCIS JENKINS.

Witnesses:
J. B. HULL,
D. H. BORCHES.